(12) United States Patent
Hu et al.

(10) Patent No.: US 9,159,503 B2
(45) Date of Patent: Oct. 13, 2015

(54) SUPERCAPACITOR AND METHOD FOR MANUFACTURING ELECTRODE THEREOF

(71) Applicant: National Tsing Hua University, Hsinchu (TW)

(72) Inventors: Chi-Chang Hu, Hsinchu (TW); Chien-Liang Liu, Hsinchu (TW); Hsiao-Hsuan Shen, Hsinchu (TW); Kuo-Hsin Chang, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 247 days.

(21) Appl. No.: 14/029,084

(22) Filed: Sep. 17, 2013

(65) Prior Publication Data

US 2014/0347785 A1    Nov. 27, 2014

(30) Foreign Application Priority Data

May 21, 2013    (TW) .............................. 102117911 A

(51) Int. Cl.
| | |
|---|---|
| *H01G 9/00* | (2006.01) |
| *H01G 11/32* | (2013.01) |
| *H01G 11/86* | (2013.01) |
| *H01G 9/04* | (2006.01) |
| *H01G 9/055* | (2006.01) |
| *H01G 11/38* | (2013.01) |

(52) U.S. Cl.
CPC ................. *H01G 11/32* (2013.01); *H01G 9/00* (2013.01); *H01G 9/04* (2013.01); *H01G 9/055* (2013.01); *H01G 11/38* (2013.01); *H01G 11/86* (2013.01); *Y02E 60/13* (2013.01); *Y10T 29/49224* (2015.01)

(58) Field of Classification Search
CPC ........... H01G 9/00; H01G 9/04; H01G 9/055; H01G 11/32; H01G 11/38
USPC ......... 361/502, 503, 504, 509–512, 516–519, 361/523–525, 528–529; 29/25.01–25.03
See application file for complete search history.

(56) References Cited

U.S. PATENT DOCUMENTS

| | | | | |
|---|---|---|---|---|
| 6,469,888 B1 * | 10/2002 | Otsuki et al. | ................... | 361/502 |
| 6,665,171 B1 * | 12/2003 | Takamuka et al. | ............. | 361/508 |
| 7,167,353 B2 * | 1/2007 | Yuyama et al. | ................ | 361/502 |
| 8,427,812 B1 * | 4/2013 | Stenger-Smith et al. | ...... | 361/502 |
| 8,737,038 B1 * | 5/2014 | Irvin et al. | ..................... | 361/502 |
| 9,068,043 B1 * | 6/2015 | Stenger-Smith et al. | ............. | 1/1 |

FOREIGN PATENT DOCUMENTS

CN          102239112 A       11/2011

* cited by examiner

*Primary Examiner* — Nguyen T Ha

(74) *Attorney, Agent, or Firm* — Muncy, Geissler, Olds & Lowe, P.C.

(57) ABSTRACT

The present invention relates to a method for manufacturing an electrode of a supercapacitor, comprising: (A) providing a carbon substrate and a phosphorus-containing precursor, and mixing the carbon substrate and the phosphorus-containing precursor at a ratio of 1:100 to 1000:1 by weight; (B) heating the mixture of the carbon substrate and the phosphorus-containing precursor to a temperature between 300° C. and 1100° C. to obtain a P-doped carbon substrate; and (C) forming an electrode of a supercapacitor by using the P-doped carbon substrate. The present invention also relates to a supercapacitor which comprises: a first electrode; a second electrode; and an electrolyte that is interposed between the first electrode and the second electrode, wherein at least one of the first electrode and the second electrode is prepared by the above-mentioned method.

10 Claims, 9 Drawing Sheets

SUPERCAPACITOR AND METHOD FOR MANUFACTURING ELECTRODE THEREOF

CROSS REFERENCE TO RELATED APPLICATION

This application claims the benefits of the Taiwan Patent Application Serial Number 102117911, filed on May 21, 2013, the subject matter of which is incorporated herein by reference.

BACKGROUND OF THE INVENTION

1. Field of the Invention

The present invention relates to a supercapacitor and a method for manufacturing an electrode thereof, and particularly a method for manufacturing an electrode of a supercapacitor by forming a P-doped carbon substrate and a supercapacitor using the manufactured electrode.

2. Description of Related Art

Energy storage has been a critical concern as the demands of energy supply become challenging in recent years. For instance, high-tech products such as mobile phones and hybrid electric vehicles/electric vehicles require both high energy density and high power supply at the same time. However, even though newly-developed batteries, like lithium batteries and fuel cells, retain very high specific energy, the high power supply still remains to be an issue. Accordingly, supercapacitors, also known as electrochemical capacitors, have attracted plenty of attention because they show the promising potential to meet such energy-storing demands without considering their extremely long cycle life.

According to the charge storage mechanism, supercapacitors are generally divided into three categories: (1) electrical double-layer capacitors (EDLCs) utilizing the electrostatic charge separation at the electrolyte/electrode interface to store electric energy; (2) redox pseudocapacitors employing electrochemically active materials with fast redox reactions at/near electrode surface; and (3) asymmetric supercapacitors consisting of two dissimilar materials with complementary working potential windows to enlarge the cell voltage and promote the energy density of supercapacitors. Supercapacitors have been extensively studied and applied to various fields in recent years, such as energy supply of mobile devices, hybrid/electric vehicles, telecommunications and so on due to their rapid recharge capability, long cycle life, and great peak/pulse power ability in comparison with rechargeable batteries as well as their much higher specific capacitance than dielectric capacitors. Among these, electrodes of the EDLCs and one electrode of the asymmetric supercapacitors are based on the coulombic electrostatic forces of electric charges in the electrical double-layer at the electrode/electrolyte interface. As the specific capacitance is directly proportional to the specific surface area accessible to the electrolyte, it remains an important issue to improve the material and microstructure of the electrode materials.

Carbon materials, such as activated carbon, carbon cloth, carbon nanotubes, graphite, graphene, carbon capsule, etc., can be applied as the electrode materials of EDLCs and one electrode of the asymmetric supercapacitors. Previous studies reported that the performance of supercapacitors can be improved by activating the carbon materials with phosphoric acid. However, the so-called phosphoric acid "activation" is mainly confined to increase the specific surface area of carbon materials, and the improvement is considerably limited.

Therefore, it would be advantageous to develop a more efficient electrode material of a supercapacitor and a method for manufacturing the same.

SUMMARY OF THE INVENTION

In view of this, the present invention provides a supercapacitor and a method for manufacturing an electrode thereof. The carbon substrate for the electrode of supercapacitors prepared according to the present invention exhibits excellent capacitive performances due to its wide pore size distribution. The results of charge-discharge and cyclic voltammetric tests also show that the phosphorus-doped carbon substrate prepared according to the present invention shows better performances and is more suitable for supercapacitors than conventional electrode materials. Therefore, the method for manufacturing the electrode of the supercapacitor according to the present invention represents a significant advancement in the field of supercapacitors.

An object of the present invention is to provide a method for manufacturing an electrode of a supercapacitor, so as to manufacture a suitable material for an electrode of such devices.

To achieve the above object, the present invention provides a method for manufacturing an electrode of a supercapacitor, comprising: (A) providing a carbon substrate and a phosphorus-containing precursor, and mixing the carbon substrate and the phosphorus-containing precursor at a ratio of 1:100 to 1000:1 by weight; (B) heating the mixture of the carbon substrate and the phosphorus-containing precursor to a temperature of 300-1100° C. to obtain a P-doped carbon material; and (C) forming an electrode of a supercapacitor by using the P-doped carbon substrate.

In the method for manufacturing an electrode of a supercapacitor according to the present invention, the carbon substrates may be any forms of carbon-containing materials, such as activated carbon, carbon fiber, carbon nanotube, graphite, graphene, carbon capsule, etc. or a combination thereof, which are subjected to the phosphorus-doping reaction. Preferably, in an aspect of the present invention, the substrate may be activated carbon, carbon fiber, or graphene. More preferably, in an embodiment of the present invention, the substrate may be graphene. However, the present invention is not limited thereto.

In the method for manufacturing an electrode of a supercapacitor according to the present invention, any phosphorus-containing substance may be used as the phosphorus-containing precursor of the present invention, as long as it can provide the phosphorus source required for the subsequent P-doping reaction. For example, in an aspect of the present invention, the phosphorus-containing precursor may be triphenylphosphine (TPP), hypophosphite, phenylphosphine, or a combination thereof. In an embodiment of the present invention, the phosphorus-containing precursor may be triphenylphosphine (TPP), but the present invention is not limited thereto.

In addition, in the method for manufacturing an electrode of a supercapacitor according to the present invention, the weight ratio of the carbon substrate and the phosphorus-containing precursor is not particularly limited, as long as the subsequent P-doping reaction can be completed. For example, in an aspect of the present invention, the ratio of the carbon material to the phosphorus-containing precursor may be 1:100 to 1000:1 by weight. In another aspect of the present invention, the ratio of the carbon substrate to the phosphorus-containing precursor may be 1:20 to 50:1 by weight. In further another aspect of the present invention, the ratio of the carbon substrate to the phosphorus-containing precursor may be 1:4 to 25:1 by weight. In an embodiment of the present invention, the ratio of the carbon substrate to the phosphorus-containing precursor may be 15:1 by weight, but the present invention is not limited thereto.

In the method for manufacturing an electrode of a supercapacitor according to the present invention, the pore size distribution of the P-doped carbon substrate for preparing the electrode will affect the performances of the resultant supercapacitors since the object of the present invention is to manufacture an electrode of a supercapacitor. Accordingly, in step (B), the P-doping reaction may be performed under a reduced pressure or an inert gas atmosphere to facilitate the development of porosity in the electrode.

In the method for manufacturing an electrode of a supercapacitor according to the present invention, the reduced pressure may be 0.01 atm or less; and the inert gas may be nitrogen, carbon dioxide, helium, neon, argon, krypton, xenon, or a combination thereof, and has a pressure from 0.01 atm to 5 atm, but the present invention is not limited thereto.

Furthermore, in the method for manufacturing an electrode of a supercapacitor according to the present invention, in step (B), a heating rate for the mixture of the carbon substrate and the phosphorus-containing precursor is not particularly limited, as long as the subsequent P-doping reaction can be completed. For example, in an aspect of the present invention, the heating rate for the mixture of the carbon substrate and the phosphorus-containing precursor may be 1° C./min to 5,000° C./min. Preferably, in an embodiment of the present invention, the heating rate for the mixture of the carbon substrate and the phosphorus-containing precursor may be 100° C./min to 5,000° C./min, and in another embodiment of the present invention, the heating rate for the mixture of the carbon substrate and the phosphorus-containing precursor may be 1,000° C./min to 5,000° C./min, but the present invention is not limited thereto.

In addition, a reaction time for the P-doping reaction in step (B) is not particularly limited, as long as the P-doping reaction can be completed. For example, in an aspect of the present invention, the reaction time for the P-doping reaction may be 1 minute to 12 hours. Preferably, in an embodiment of the present invention, the reaction time for the P-doping reaction may be 1 to 6 hours, and more preferably 1 to 3 hours, but the present invention is not limited thereto.

In the method for manufacturing an electrode of a supercapacitor according to the present invention, the way for forming the electrode in step (C) is not particularly limited, as long as the electrode of the supercapacitor required for the present invention can be formed. For example, in an aspect of the present invention, the required electrode of the supercapacitor may be formed by coating the P-doped carbon substrate on a current collector. Also, any conventional material for the current collector may be used, as long as it may be used as the current collector required for serving as the electrode of the present invention. For example, in an aspect of the present invention, the current collector may be a metal, an electrically conductive oxide, or an electrically conductive polymer, but the present invention is not limited thereto. Preferably, in an embodiment of the present invention, the current collector may be, at least, one selected from the group consisting of platinum, titanium, gold, silver, copper, aluminum, nickel, stainless steel, conductive glass, conductive plastic and graphite. Furthermore, in addition to the above-mentioned way for forming the electrode of the supercapacitor, those of ordinary skill in the art may also stack the P-doped carbon substrates to form a conductive film, thereby completing an electrode of a supercapacitor. The present invention is also not limited thereto.

According to the method for manufacturing an electrode of a supercapacitor developed in the present invention, it may include adjustment of the preparation conditions, such as the proportion of the substrate and phosphorous-containing precursor, heating rate, reaction temperature, reaction time, reaction pressure and the atmosphere, to thereby prepare a P-doped carbon material through the P-doping reaction, and using the P-doped carbon substrate to form an electrode of a supercapacitor.

Another object of the present invention is to provide a supercapacitor, wherein the electrode of the supercapacitor is prepared according to the present invention, and thus the prepared supercapacitor exhibits excellent capacitive performances.

To achieve the above object, the present invention provides a supercapacitor, comprising: a first electrode; a second electrode; and an electrolyte interposed between the first electrode and the second electrode, wherein at least one of the first electrode and the second electrode is prepared by the above method for manufacturing an electrode of a supercapacitor.

In the P-doped carbon materials of the supercapacitor according to the present invention, the P-doping content is not particularly limited, as long as the performance of the supercapacitor may be improved. For example, in an aspect of the present invention, at least one of the first electrode and the second electrode has a P-doping content from 0.001 atomic percent to 30 atomic percents, based on a total atomic number of the P-doped carbon substrate.

In addition, the pore size distribution of the electrode is not particularly limited, as long as the performances of the supercapacitor may be improved. However, as described above, the pore size distribution of the P-doped carbon substrate for preparing the electrode will affect the performances of resultant supercapacitors, and therefore, in an aspect of the present invention, at least one of the first electrode and the second electrode can comprise a porous structure with its pore size varying from 1 nm to 100 nm, but the present invention is not limited thereto.

Furthermore, in the P-doped carbon substrates of the supercapacitor according to the present invention, the surface properties of the electrode for the supercapacitor are changed after the P-doping reaction since the electrode of the supercapacitor is prepared by the above-mentioned method. For example, at least one of the first electrode and the second electrode has a contact angle of 100° to 160°, but the present invention is not limited thereto.

Moreover, in the supercapacitor according to the present invention, any type of electrolytes can be applied in the supercapacitor without particular limitation. In other words, the present invention is technically characterized in the electrode of the supercapacitor and the method for manufacturing the same, which therefore may be applied in various forms of the supercapacitors, without particular limitation. For example, in an aspect of the present invention, the electrolyte may be a liquid electrolyte, solid electrolyte, or gel electrolyte. Therefore, the prepared supercapacitor can be an aqueous supercapacitor, an ionic liquid supercapacitor, an organic supercapacitor, a Li-ion supercapacitor or a solid-state supercapacitor, but the present invention is not limited thereto. Preferably, in an aspect of the present invention, when the electrode prepared according to the present invention is applied to the aqueous supercapacitor, the maximum cell voltage of this supercapacitor may be 2 V to 2.5 V. In another aspect of the present invention, when the electrode prepared according to the present invention is applied to the organic supercapacitor, the maximum cell voltage of such a supercapacitor may be 2.9 V to 3.3 V. In further another aspect of the present invention, when the electrolyte for the supercapacitor is an ionic liquid, its maximum cell voltage may be up to 3.5 V to 4.7 V. However, the present invention is not limited to the specific aspects listed above.

Accordingly, the supercapacitor containing the electrode prepared by the method according to the present invention may show a higher specific capacitance and excellent pulse/peak power characteristics.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Preparation of the Electrode Material

Example

First, 0.25 g natural graphite and 0.25 g sodium nitrate ($NaNO_3$) were added into 10-mL 98% sulfuric acid. Then, 1 g potassium permanganate ($KMnO_4$) was added thereto and ultra-sonicated for 1 hour. Next, 20-mL deionized water was dropped into the above mixture slowly. Finally, 10-mL 30% hydrogen peroxide was added to quench the reaction, and the reaction product was washed with deionized water to obtain the graphene oxide to be served as one of the carbon raw materials of the present invention and was dispersed in 80-mL methanol. To prepare the carbon substrate solution for the P doping reaction, 62.5 mg graphene oxide powders were homogeneously dispersed in a 20-mL methanol solution.

Then, 1.25 mg, 2.25 mg, 3.25 mg, 4.25 mg, 5.25 mg, 6.25 mg, 7.25 mg, 8.25 mg, 9.25 mg, 10 mg, 15 mg, 20 mg, 25 mg, 30 mg, 100 mg, 200 g, 500 mg, 750 mg and 1,000 mg triphenylphosphine served as the phosphorus-containing precursor were dissolved in 1-mL methanol, respectively. Each of the methanol solutions with the phosphorus-containing precursor was mixed with the above-described methanol solution containing the graphene oxide powders (62.5 mg/20 mL), and stirred for 2 hours. Then, the mixed methanol solution containing triphenylphosphine and graphene oxide was dried at 50° C. to obtain a uniform mixture of graphene oxide and triphenylphosphine. The dried uniform mixture was placed in a preheated furnace and heated to 900° C., under a reduced pressure at a heating rate from 20° C./min to 5,000° C./min, to perform the phosphorus doping reaction. After 4 hours, the mixture was cooled to obtain P-doped graphene as a P-doped carbon substrate.

Comparative Example

The Comparative Example was substantially the Same as the Example, except that the electrode material was prepared without being subjected to the P-doping reaction treatment. That is, preparation of the electrode material in the Comparative Example completely followed the same procedure for the preparation of P-doped graphene but without adding the methanol solution with the phosphorus-containing precursor.

《Physical Property Analysis》

The electrode materials prepared in the Example and Comparative Examples were analyzed for the following physical properties, and the results are described as follows.

Figure 1:
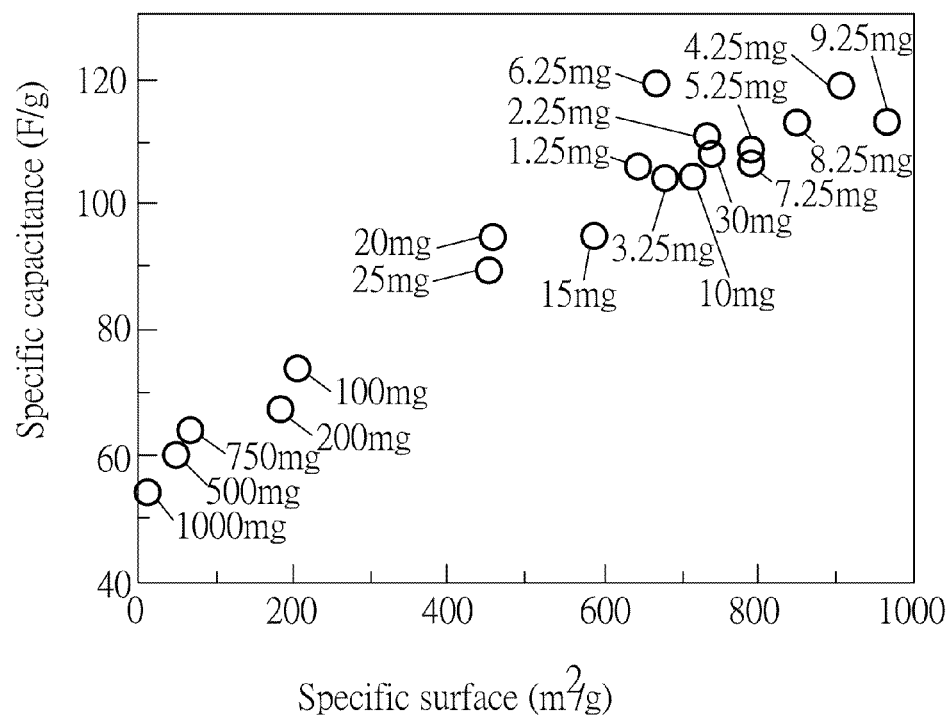
FIG. 1 is a schematic diagram showing specific surface area versus specific capacitance according to an Example of the present invention.

FIG. 1 shows a schematic diagram about the specific surface area against the specific capacitance of various P-doped graphene samples according to the Example. The markings represent the contents of triphenylphosphine in the above Example. As shown in FIG. 1, the specific surface area of the prepared P-doped graphene substrate changed with the weight ratio of the substrate and the phosphorus-containing precursor, and the specific capacitance of the P-doped substrate increased with increasing the specific surface area. In this Example, when 4.25 mg triphenylphosphine and 62.5 mg graphene oxide were employed, the specific surface area of the P-doped substrate reached up to nearly 1,000 $m^2/g$, and the specific capacitance of the P-doped substrate approached to about 120 F/g. Accordingly, the P-doped graphene substrate prepared under this condition was employed for the following tests.

Figure 2A:
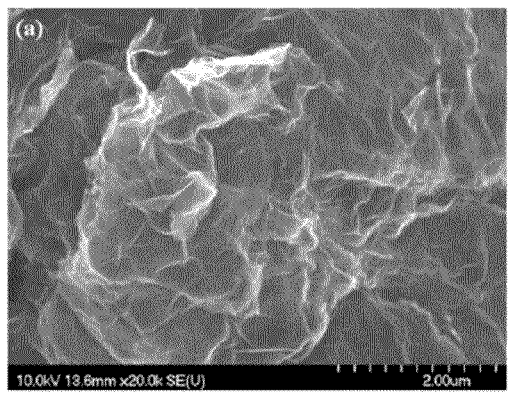
FIGS. 2A-2C are scanning electron microscopic and transmission electron microscopic images according to an Example of the present invention.
Figure 2B:
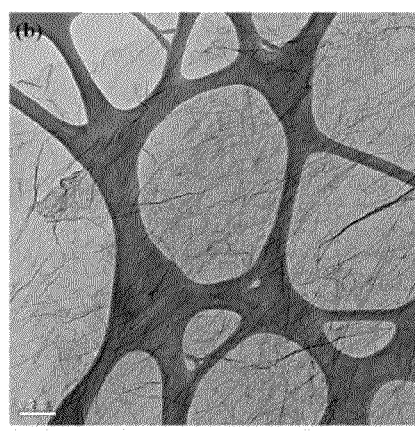
Figure 2C:
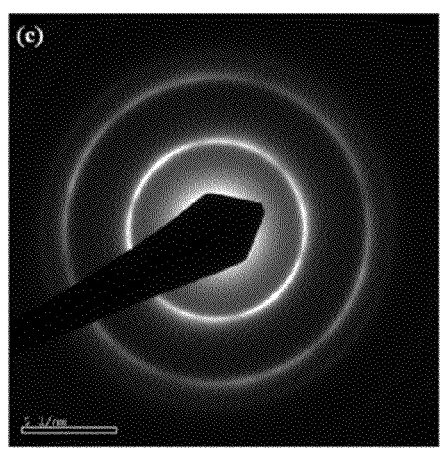

FIGS. 2A-2C show the electron microscopic images according to the Example (triphenylphosphine/graphene oxide=4.25 mg/62.5 mg). FIG. 2A is the scanning electron microscopic (SEM) image, FIG. 2B is the transmission electron microscopic (TEM) image, and FIG. 2C is the selected area electron diffraction (SAED) pattern. As shown in FIGS. 2A and 2B, P-doped graphene showed a loose and porous structure, indicating that the P-doping reaction resulted in a high porosity. As shown in FIG. 2C, the P-doped graphene of the Example exhibited clear rings instead of clear diffraction spots in a hexagonal pattern, indicating that the oxygen-containing functional groups of the graphene oxide could be quickly removed through the P-doping reaction.

Figure 3A:
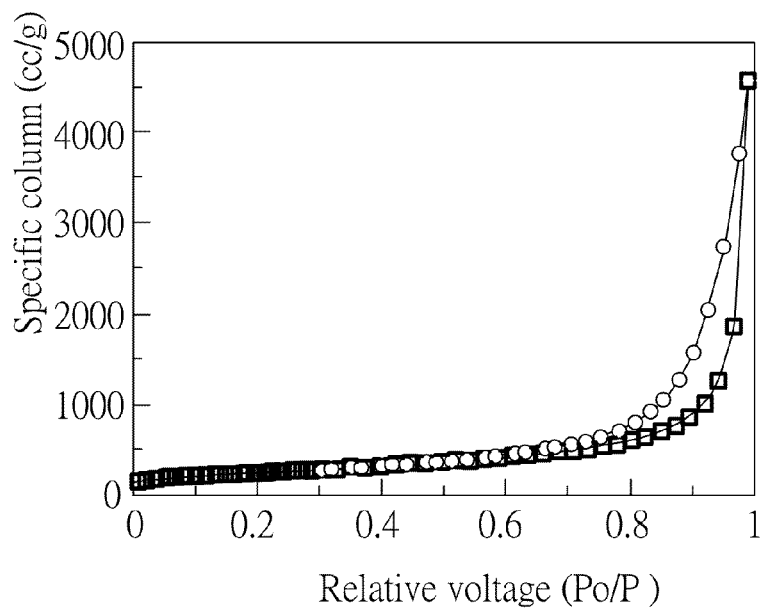
FIG. 3A shows the $N_2$ adsorption/desorption isotherms according to an Example of the present invention.
Figure 3B:
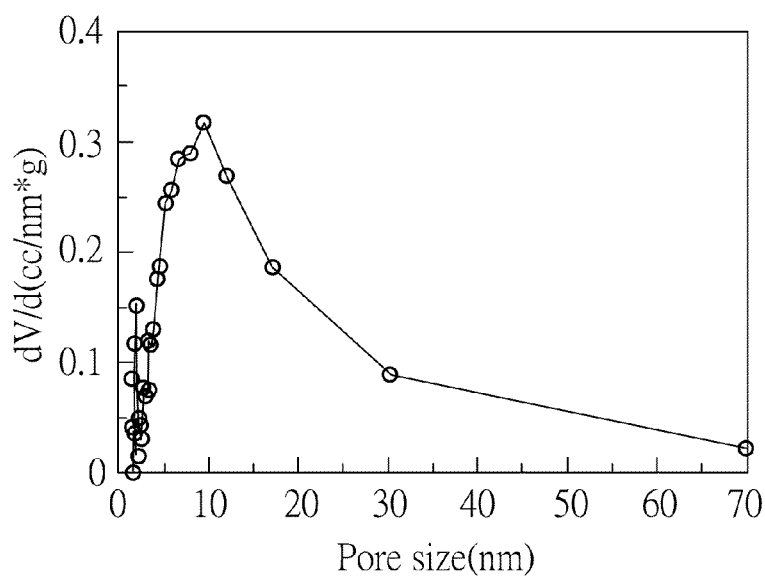
FIG. 3B shows the pore size distribution according to an Example of the present invention.

FIGS. 3A and 3B show the nitrogen adsorption/desorption isotherms and the pore size distribution, respectively, according to the Example (triphenylphosphine/graphene oxide=4.25 mg/62.5 mg). As shown in FIG. 3A, the type IV isotherm with a type III hysteresis loop presented by the P-doped graphene at the relative pressure ($P/P_0$) from 0.4 to 1.0 indicates the formation of slit-shaped mesopores. This phenomenon resulted from the rapid gas evolution, created by the detachment of oxygen-containing functional groups and a rapid reaction between the oxygen-containing functional group and triphenylphosphine at a high temperature, yielding a high pressure to exfoliate graphene sheets and to form open channels between 2-dimensional graphene sheets. As shown in FIG. 3B, the prepared P-doped graphene exhibits a very broad pore size distribution from 2 nm to 70 nm. Therefore, the P-doped graphene exhibited a very high specific surface area (905.67 $m^2/g$) due to the slit mesopores.

Figure 4:
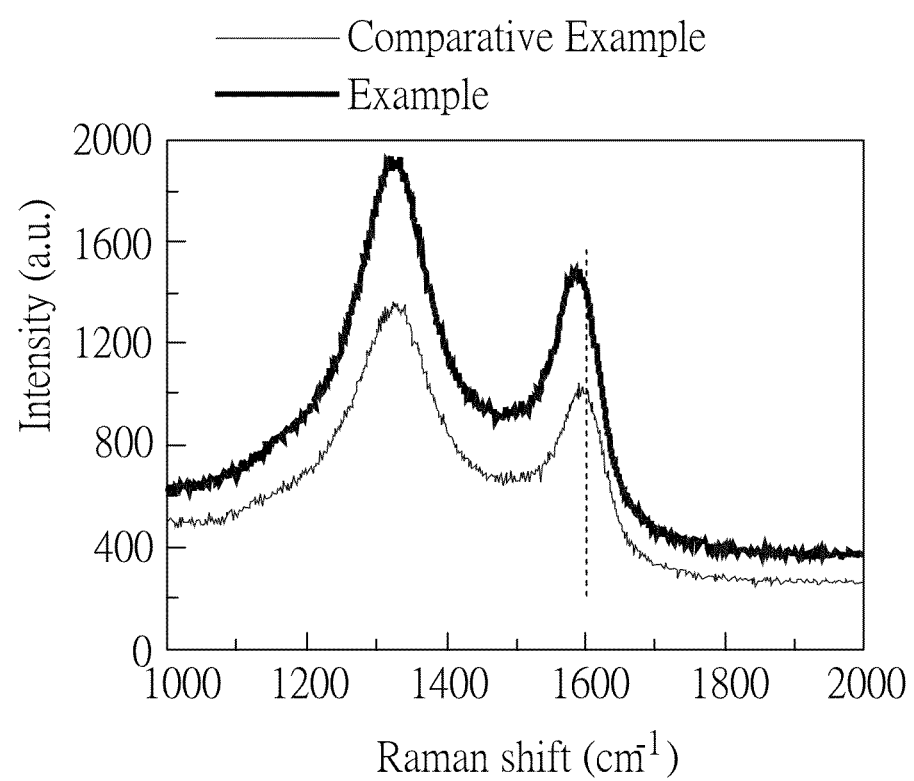
FIG. 4 shows the Raman spectra according to an Example of the present invention and the Comparative Example.

FIG. 4 shows the Raman spectra according to the Example (triphenylphosphine/graphene oxide=4.25 mg/62.5 mg) and the Comparative Example. In general, the characteristic peak at 1319.1 $cm^{-1}$ is the D-band of graphene and the characteristic peak at 1600 $cm^{-1}$ corresponds to the G-band of graphene. Thus, the intensity ratio ($I_D/I_G$) of D-band to G-band reflects a defect level of the graphene material. As shown in FIG. 4, the P-doped graphene of the Example had an $I_D/I_G$ value of 1.29, and the reduced graphene oxide of the Comparative Example had an $I_D/I_G$ value of 1.27, indicating that the P-doped graphene of the Example had a similar defect level to the thermally reduced graphene oxide. In addition, after the P-doping reaction, the G-band characteristic peak of the Example was blue-shifted from 1598.1 $cm^{-1}$ to 1589.3 $cm^{-1}$, indicating that phosphorous was successfully doped into graphene by the method of the invention.

Accordingly, it can be known from the above tests that a P-doped graphene with a high specific surface area and high specific capacitance was obtained in the Example.

《Electrochemical Property Analysis》

In the above physical property analyses, the specific capacitance of the P-doped graphene substrates varied with the content of the phosphorus-containing precursor. In the following, the P-doped graphene substrate of the Example and the thermally reduced graphene oxide of the Comparative example were further analyzed for their electrochemical properties.

Figure 5A:
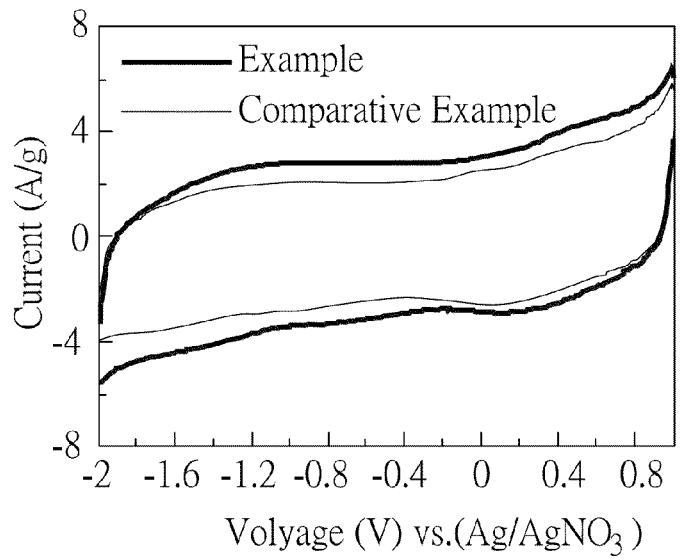
FIG. 5A shows the cyclic voltammograms according to an Example of the present invention and the Comparative Example.

FIG. 5A shows the cyclic voltammograms of the Example (triphenylphosphine/graphene oxide=4.25 mg/62.5 mg) and the Comparative Example, wherein the electrode Materials prepared in the Example and the Comparative Example were subjected to a cyclic voltammetric test in propylene carbonate (PC) containing 1M tetraethyl ammonium tetra-fluoroborate ($TEABF_4$) at a scan rate of 25 mV/s. As shown in FIG. 5A, the P-doped graphene of the Example showed a specific capacitance of about 120 F/g, while the thermally reduced graphene oxide of the Comparative example exhibited a specific capacitance of ca. 94 F/g estimated from integrating the cyclic voltammograms of the Example and the Comparative Example. Therefore, at a scan rate of 25 mV/s, the P-doped graphene prepared in the Example demonstrated superior capacitive properties, such as a high specific capacitance, excellent reversibility, and a rectangular-shaped cyclic voltammetric pattern.

Figure 5B:
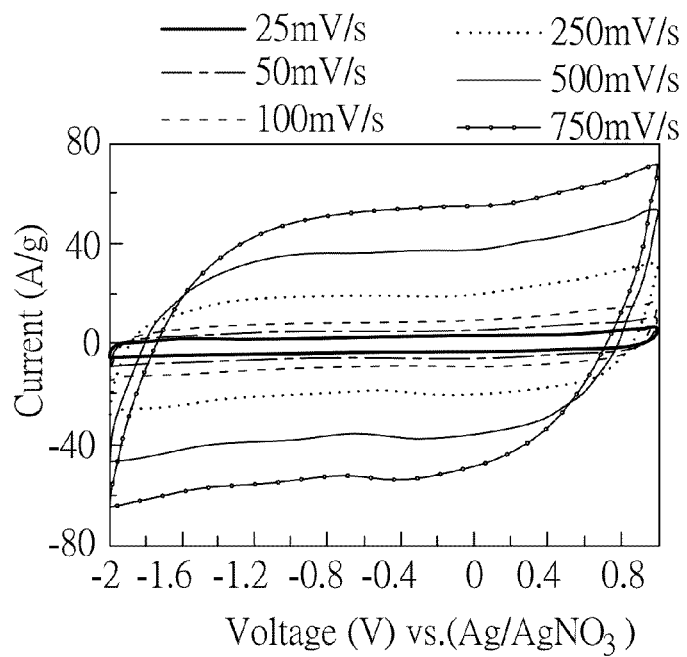
FIG. 5B shows the cyclic voltammograms measured at different scan rates of CV according to an Example of the present invention.

FIG. 5B shows the cyclic voltammograms of the Example (triphenylphosphine/graphene oxide=4.25 mg/62.5 mg) obtained at different scan rates. The electrode material prepared in the Example was subjected to a cyclic voltammetric test in propylene carbonate (PC) containing 1M tetraethyl ammonium tetra-fluoroborate ($TEABF_4$) at a scan rate of 25 mV/s, 50 mV/s, 100 mV/s, 250 mV/s, 500 mV/s, and 750 mV/s, respectively. As shown in FIG. 5B, the voltammetric patterns tested at all scan rates in the above range were rectangular-like and highly symmetric, indicating that the P-doped graphene of the Example possessed highly reversible charge-discharge responses.

Based on all the above results of electrochemical property analyses, the P-doped graphene of the Example exhibited high specific capacitance and excellent charge-discharge characteristics.

Test Examples 1 and 2

In the Test Examples 1 and 2, the P-doped graphene of the Example (triphenylphosphine/graphene oxide=4.25 mg/62.5 mg) and the thermally reduced graphene oxide of the Comparative Example were respectively coated on a graphite sheet (a current collector) to form an electrode of a supercapacitor for evaluating the intrinsically specific power and specific energy of the electrode materials for the supercapacitor application. In the Test Examples 1 and 2, the analysis apparatus for the electrode of the supercapacitor was a three-electrode configuration, using the above electrodes prepared in the Test Examples 1 and 2 as the working electrodes, a platinum electrode as the counter electrode, a silver/silver nitrate ($Ag/AgNO_3$) electrode as the reference electrode, and a propylene carbonate (PC) solution containing 1M tetraethyl ammonium tetra-fluoroborate ($TEABF_4$) as the electrolyte.

Figure 6:
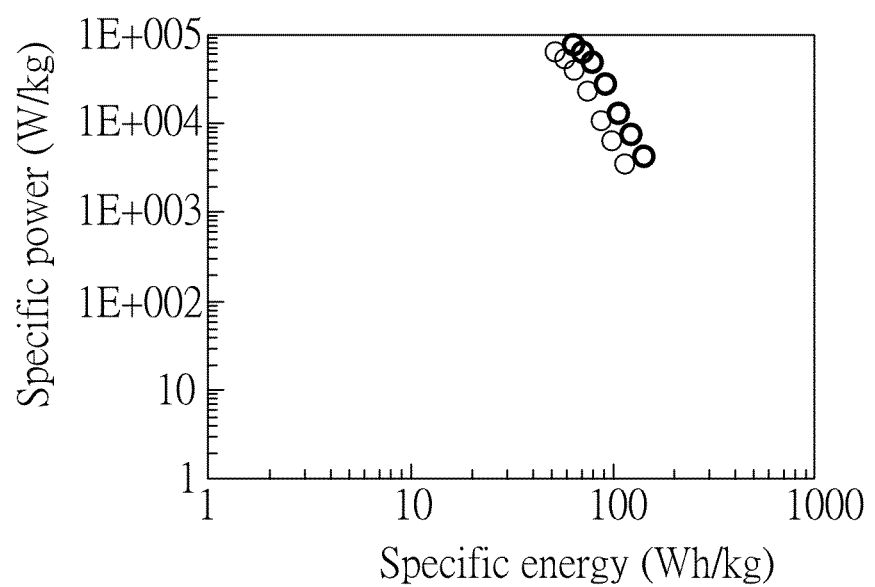
FIG. 6 shows the intrinsic specific power-specific energy plots of an Example of the present invention and the Comparative Example under the three-electrode mode according to the Test Examples 1-2 of the present invention.

FIG. 6 shows the specific power against specific energy plot of the electrode materials prepared in the Test Examples 1 and 2 under the three-electrode mode analysis apparatus. As shown in FIG. 6, at 750 mV/s, the single electrode of the supercapacitor in the Test Example 1 possessed a specific energy of 53.88 Wh/kg and a specific power of 48.49 kW/kg. On the contrary, at 750 mV/s, the single electrode of the supercapacitor in the Test Example 2 showed a specific energy of 44.4 Wh/kg and a specific power of 39.96 kW/kg. Therefore, the electrode prepared from the P-doped graphene in the Example of the present invention resulted in a supercapacitor with higher specific power and specific energy.

Test Example 3

To further understand the capacitive performances of P-doped carbon materials, in the Test Example 3, the P-doped graphene prepared in the above Example (triphenylphosphine/graphene oxide=4.25 mg/62.5 mg) was coated on two graphite sheets (current collectors) to form the electrodes of a supercapacitor. In the Test Example 3, a two-electrode supercapacitor, i.e., a full cell, was examined, wherein both electrodes were made of the P-doped graphene, and the electrolyte used was a propylene carbonate (PC) solution containing 1M tetraethyl ammonium tetra-fluoroborate ($TEABF_4$).

Figure 7A:
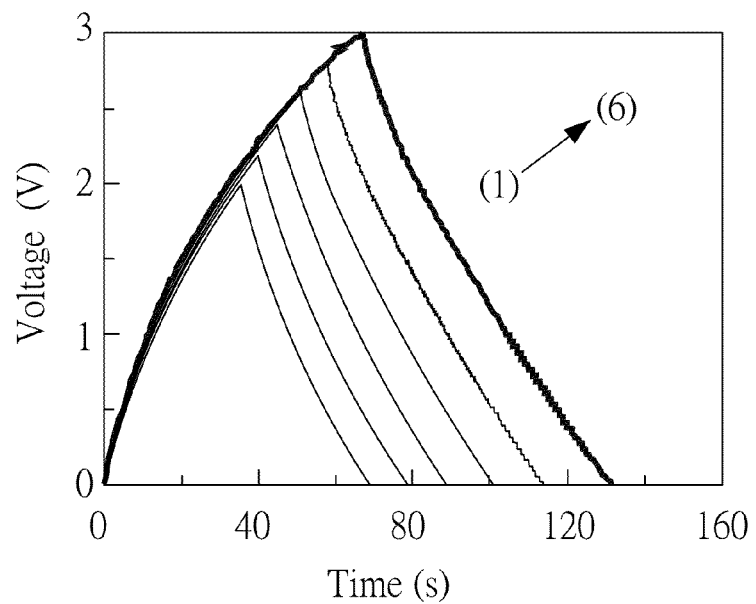
FIGS. 7A and 7B show the charge-discharge curves according to the Test Example 3 of the present invention.
Figure 7B:
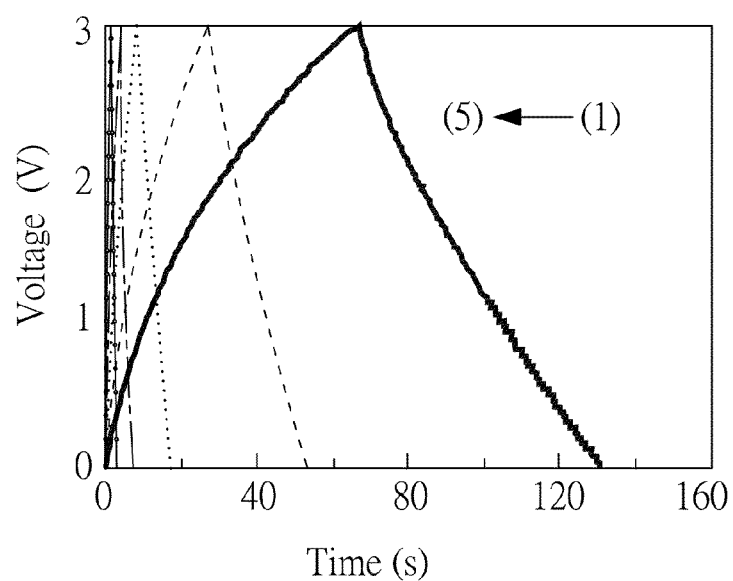

FIGS. 7A and 7B show the typical charge-discharge curves of a full cell according to the Test Example 3 of the present invention. In more detail, FIG. 7A shows the charge-discharge curves of the supercapacitor at a current density of 1.25 A/g with a cell voltage of (1) 2.0 V, (2) 2.2 V, (3) 2.4 V, (4) 2.6 V, (5) 2.8 V, and (6) 3.0 V, respectively, while FIG. 7B shows the charge-discharge curves of the supercapacitor with a cell voltage of 3.0 V at a current density of (1) 1.25 A/g, (2) 2.5 A/g, (3) 6.25 A/g, (4) 12.5 A/g, and (5) 25 A/g, respectively.

As shown in FIG. 7A, in all test conditions, since both electrodes were made of the P-doped graphene prepared in the above-mentioned Example, the charge-discharge curves of the supercapacitor exhibited excellent symmetry, and the cell voltage of the supercapacitor could reach up to 3.0 V.

Furthermore, as shown in FIG. 7B, at different current densities, the charge-discharge curves of the supercapacitor at a constant current showed that the voltage was approximately linearly proportional to the charge or discharge time. In addition, in all the curves, voltage loss (ohmic loss or iR drop) was not obvious, indicating that the equivalent series resistance (ESR) was very low.

Figure 7C:
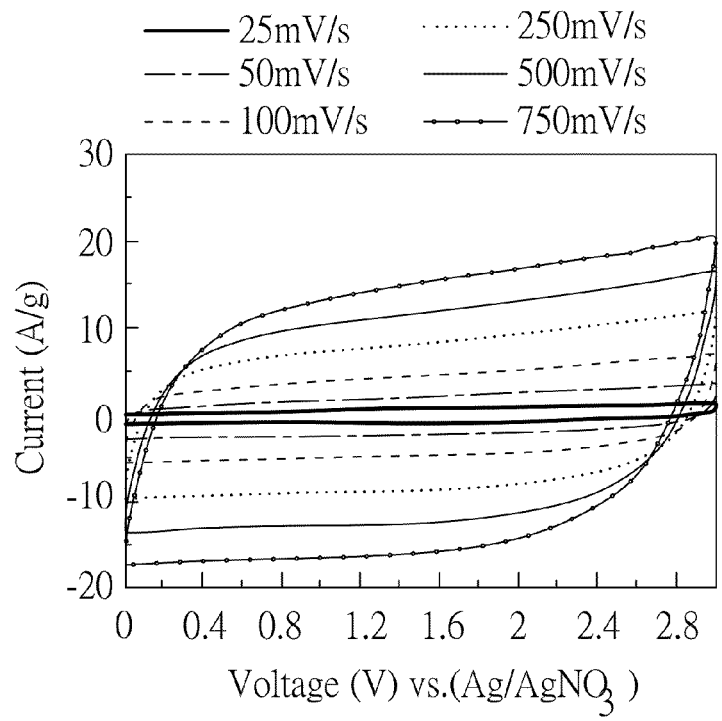
FIG. 7C shows the cyclic voltammograms measured at different scan rates of CV according to the Test Example 3 of the present invention.

FIG. 7C shows the cyclic voltammograms of a full cell according to the Test Example 3 of the present invention, which were measured at a scan rate of 25 mV/s. 50 mV/s, 100 mV/s, 250 mV/s. 500 mV/s, and 750 mV/s, respectively. As shown in FIG. 7C, the cyclic voltammograms measured at all scan rates in the above test range were rectangular-like and highly symmetric, indicating that the P-doped graphene prepared in the Test Example 3 possessed highly reversible charge-discharge characteristics.

Figure 7D:
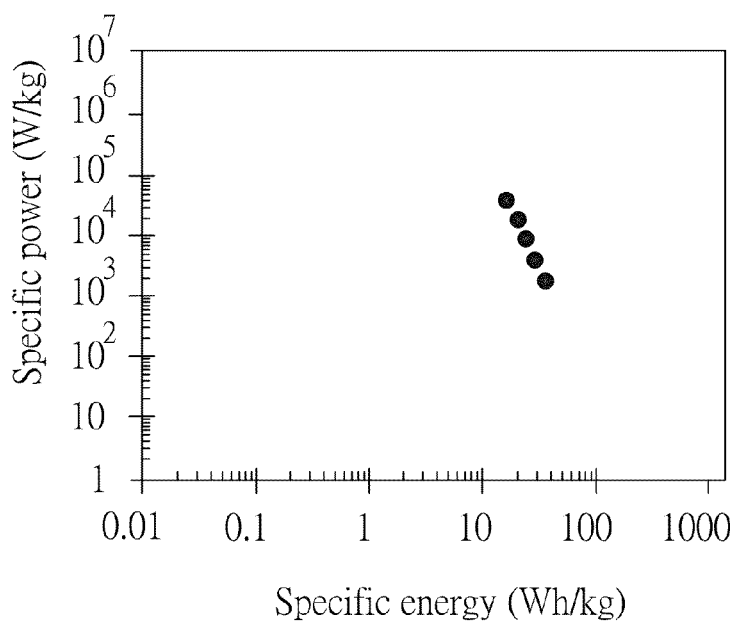
FIG. 7D shows the specific power against specific energy plot of the supercapacitor (a full cell) according to the Test Example 3 of the present invention.

FIG. 7D shows the Ragone plot (specific power against specific energy) of the supercapacitor according to the Test Example 3 of the present invention. As shown in FIG. 7D, with a cell voltage of 3.0 V at a current density of 0.8 A/g, the specific energy of the supercapacitor was 39 Wh/kg. When the current density was 25 A/g, the specific energy and specific power of the supercapacitor were equal to 15.63 Wh/kg and 37.5 kW/kg, respectively. Both characteristics are higher than the performances of a conventional supercapacitor (for example: a specific energy of less than 10 Wh/kg, and a specific power of 10 kW/kg), indicating that the supercapacitor of the present invention shows superior capacitive performances.

Figure 8A:
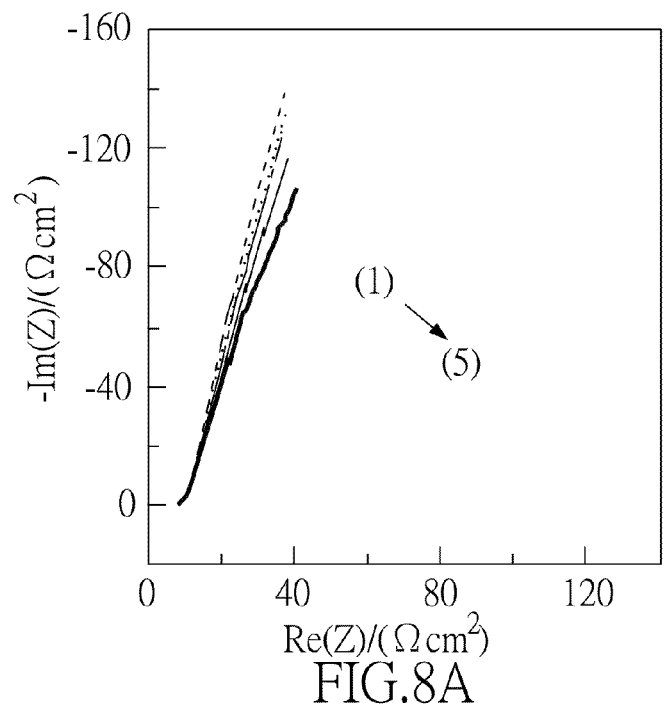
FIGS. 8A and 8B show the electrochemical impedance spectroscopic (EIS) spectra of the supercapacitor according to the Test Example 3 of the present invention.
Figure 8B:
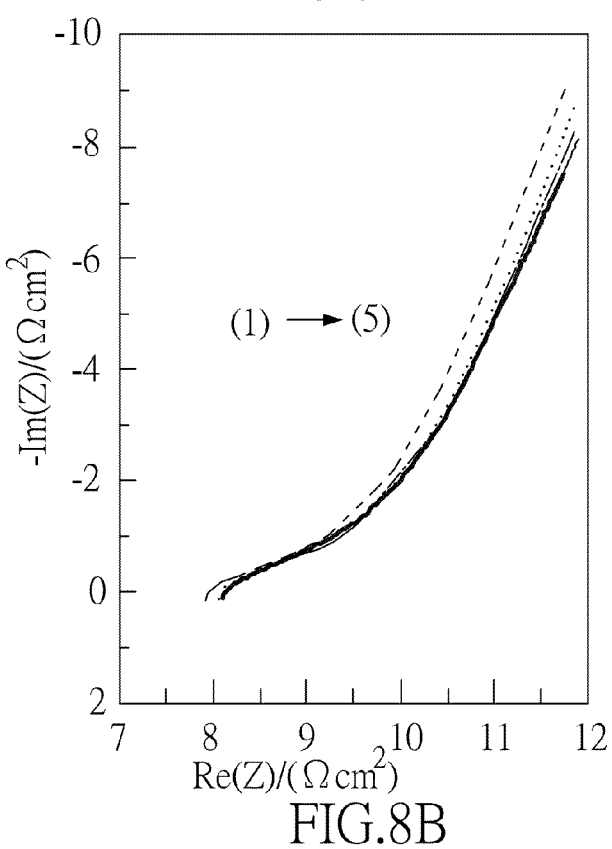

Next, the excellent performances of the supercapacitor in the Test Example 3 were further evaluated by electrochemical impedance spectroscopic (EIS) analysis. FIGS. 8A and 8B show the EIS spectra of the supercapacitor according to the Test Example 3 of the present invention. In more detail, FIG. 8A shows the EIS spectra of the supercapacitor in a frequency region ranging from 100 kHz to 0.1 Hz with the cell voltage fixed at (1) 0.6 V, (2) 1.2 V, (3) 1.8 V, (4) 2.4 V, and (S) 3.0 V. FIG. 8B is an enlarged view of FIG. 8A in the high frequency range. As shown in FIG. 8A, within the above test range, all of the EIS spectra were close to a vertical line, indicating the typical capacitive behavior. As shown in FIG. 8B, the unobvious arc starting at $Re(Z)=8$ $\Omega cm^2$ was attributable to the highly porous structure of the P-doped graphene on the electrode and the excellent electrical conductivity of P-doped graphene. Therefore, from the result shown in FIGS. 8A and 8B, the supercapacitor of the Test Example 3 is confirmed to exhibit superior capacitive performances.

Accordingly, from the results of the above Example, Comparative Example and the Test Examples, the method for Manufacturing an electrode of the present invention is very suitable for preparing an electrode of a supercapacitor, and the supercapacitor using the electrode exhibits excellent charge-discharge characteristics and superior capacitive performances.

It should be understood that these examples are merely illustrative of the present invention and the scope of the invention should not be construed to be defined thereby, and the scope of the present invention will be limited only by the appended claims.

What to be claimed is:

1. A method for manufacturing an electrode of a supercapacitor, comprising:
   (A) providing a carbon substrate and a phosphorus-containing precursor, and mixing the carbon substrate and the phosphorus-containing precursor at a ratio of 1:100 to 1000:1 by weight to form a mixture, wherein the carbon substrate is activated carbon, carbon fiber, carbon nanotube, graphite, graphene, carbon capsule, or a combination thereof;
   (B) heating the mixture of the carbon substrate and the phosphorus-containing precursor to a temperature between 300° C. and 1100° C. to obtain a P-doped carbon substrate; and
   (C) forming an electrode of a supercapacitor by using the P-doped carbon substrate.

2. The method for manufacturing an electrode of a supercapacitor of claim 1, wherein the phosphorus-containing precursor is triphenylphosphine, hypophosphite, phenylphosphine, or a combination thereof.

3. The method for manufacturing an electrode of a supercapacitor of claim 1, wherein the step (B) is performed under a reduced pressure or an inert gas atmosphere.

4. The method for manufacturing an electrode of a supercapacitor of claim 3, wherein the reduced pressure is 0.01 atm or less; and the inert gas is nitrogen, carbon dioxide, helium, neon, argon, krypton, xenon, or a combination thereof.

5. The method for manufacturing an electrode of a supercapacitor of claim 1, wherein the step (B) is performed with a heating rate from 1° C./min to 5,000° C./min.

6. A supercapacitor, comprising:
   a first electrode;
   a second electrode; and
   an electrolyte interposed between the first electrode and the second electrode,
   wherein at least one of the first electrode and the second electrode is prepared by the method of claim 1.

7. The supercapacitor of claim 6, wherein at least one of the first electrode and the second electrode has a P-doping content varying from 0.001 atomic percent to 30 atomic percents, based on a total atomic number of the P-doped carbon substrate.

8. The supercapacitor of claim 6, wherein at least one of the first electrode and the second electrode comprises a porous structure with a broad pore size distribution from 1 nm to 100 nm.

9. The supercapacitor of claim 6, wherein at least one of the first electrode and the second electrode exhibits a contact angle between 100° and 160°.

10. The supercapacitor of claim 6, wherein the electrolyte is a liquid electrolyte, a solid electrolyte, or a gel electrolyte.

* * * * *